(12) United States Patent
Okada et al.

(10) Patent No.: US 6,437,848 B1
(45) Date of Patent: Aug. 20, 2002

(54) LIQUID CRYSTAL LIGHT MODULATING ELEMENT

(75) Inventors: Masakazu Okada, Kyoto; Eiji Kido, Toyonaka; Katsuhiko Asai, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 27 days.

(21) Appl. No.: 09/627,996

(22) Filed: Jul. 28, 2000

(30) Foreign Application Priority Data

Aug. 2, 1999 (JP) .......................................... 11-218980

(51) Int. Cl.$^7$ .......................... G02F 11/339; G02F 4/397
(52) U.S. Cl. .......................................... 349/156; 349/74
(58) Field of Search ................................ 349/155, 156, 349/74, 76, 77

(56) References Cited

U.S. PATENT DOCUMENTS

| | | | |
|---|---|---|---|
| 4,249,800 A | 2/1981 | Spruijt | 350/320 |
| 5,285,304 A | 2/1994 | Hotta et al. | 359/81 |
| 5,473,450 A | 12/1995 | Yamada et al. | 359/51 |
| 5,589,966 A * | 12/1996 | Hama et al. | 349/194 |
| 5,682,218 A | 10/1997 | Shimizu et al. | 349/156 |
| 5,706,109 A * | 1/1998 | Yamada et al. | 359/81 |
| 5,729,312 A | 3/1998 | Yamagishi et al. | 349/86 |
| 5,739,882 A | 4/1998 | Shimizu et al. | 349/123 |
| 5,745,085 A * | 4/1998 | Tomio et al. | 345/63 |
| 5,796,447 A * | 8/1998 | Okumura et al. | 349/33 |
| 5,815,232 A * | 9/1998 | Miyazaki et al. | 349/155 |
| 5,986,729 A * | 11/1999 | Yamanaka et al. | 349/79 |
| 6,052,161 A | 4/2000 | Yamada et al. | 349/32 |
| 6,067,138 A | 5/2000 | Nishiguchi et al. | 349/117 |
| 6,187,485 B1 * | 2/2001 | Matsushima et al. | 430/7 |
| 6,221,543 B1 * | 4/2001 | Guchler et al. | 430/7 |
| 6,226,067 B1 * | 5/2001 | Nishiguchi et al. | 349/155 |

FOREIGN PATENT DOCUMENTS

| | | |
|---|---|---|
| JP | 62-203123 | 9/1987 |
| JP | 08-110524 | 4/1996 |
| JP | 09-068698 | 3/1997 |
| JP | 09-197412 | 7/1997 |
| JP | 11-109368 A | 4/1999 |

OTHER PUBLICATIONS

U. S. patent application Ser. No. 09/630,030, Okada et al., filed Jul. 31, 2000.
U. S. patent application Ser. No. 09/630,268, Okada et al., filed Aug. 1, 2000.

* cited by examiner

Primary Examiner—Toan Ton
Assistant Examiner—Hoan Nguyen
(74) Attorney, Agent, or Firm—Sidley Austin Brown & Wood LLP

(57) ABSTRACT

A liquid crystal light modulating element is disclosed having both spacers that control the size of the gap between substrates as well as resin bodies located between the substrates which support the substrates. The resin bodies are arranged in specific patterns, relative to the pixels which are arrayed in a matrix arrangement, such that the substrates are supported while the location and density of the resin bodies are not visually objectionable. Both the liquid crystal light modulating element, as well as techniques for the construction thereof are disclosed.

24 Claims, 6 Drawing Sheets

LIQUID CRYSTAL LIGHT MODULATING ELEMENT

RELATED APPLICATIONS

This application is based on application no. 11-218980 filed in Japan, the contents of which are hereby incorporated by reference.

FIELD OF THE INVENTION

The present invention relates to a liquid crystal light modulating element.

BACKGROUND OF THE INVENTION

A liquid crystal light modulating element includes a liquid crystal material having a light modulation function, such that when a voltage is impressed to the liquid crystal material via electrodes, the molecular alignment of the liquid crystal material changes and this change in molecular alignment is used as a shutter.

A liquid crystal light modulating element normally includes two substrates, at least one of which is transparent, together with electrodes, and the liquid crystal material is located in between the two substrates.

In a liquid crystal light modulating element in which a liquid crystal material is located between two substrates, a problem arises that if the gap between the two substrates is not uniform in the light modulation range, display performance is degraded. Therefore, the problem arises of how to maintain a uniform gap between the two substrates.

Conventionally, when such a liquid crystal light modulating element is constructed, the gap between the substrates is controlled by applying a sealing material in which a gap regulating material—termed spacers—is dispersed onto the substrate in the outer areas surrounding the light modulation range by means of screen printing or another method, thereby dispersing the spacers in the light modulation range as well.

However, as liquid crystal light modulating elements have increased in size and quality, it has become essential to ensure that the gap between the substrates is uniform over their entire area. The conventional method, in which the sealing material within which the spacers are dispersed is applied to the substrate outer areas surrounding the light modulation range, thereby dispersing the spacers inside the light modulation range, entails the problem that variations in the gap distance occur between the center of the substrates and the areas on the periphery of the substrates. This problem is particularly conspicuous in light modulating elements that use ferroelectric liquid crystal and in light modulating elements that use the selective reflection property of cholesteric (chiral nematic) liquid crystal. In other words, in ferroelectric liquid crystal elements, the non-uniformity of the gap between the substrates results in unevenness in the orientation of the liquid crystal molecules, which leads to a degradation of display performance, while in a cholesteric liquid crystal element, where matrix driving is used, for example, the non-uniformity of the gap between the substrates results in a degradation of the threshold characteristic when matrix driving is performed, and an uneven display.

As a means to resolve the problems identified above, Japanese Laid-Open Patent Application Hei 11-109368 discloses a liquid crystal light modulating element that comprises a pair of substrates, at least one of which is transparent, and a liquid crystal light modulating layer that is sandwiched between the two substrates, wherein the liquid crystal light modulating layer comprises a liquid crystal material that performs light modulation, spacers that maintain the gap between the substrates at a prescribed distance, and resin bodies of which a thermoplastic high-polymer material forms the principal component, where the resin bodies are located within the light modulation range in accordance with a prescribed principle and serve as an adhesive to bond and support the two substrates.

In the above-described liquid crystal light modulating element, the resin bodies create a strong bond between the pair of substrates so that the gap between them is maintained at a uniform distance over their entire area. It also increases the productivity when manufacturing the element.

In a liquid crystal light modulating element having the construction described above, where multiple pixels are formed in a matrix arrangement, it is preferable that the principle governing the location of the resin bodies specify that they should be located (1) between each pixel so as to prevent a reduction in the effective display rate of the liquid crystal light modulating element, and (2) at the corners of all of the pixels, i.e., in all areas at which the spaces between the vertical columns and the horizontal rows of the pixels intersect, in order to improve the strength of the liquid crystal light modulating element.

However, in a liquid crystal light modulating element having a construction in which the resin bodies are located at the corners of all pixels, the following problems exist.

FIGS. 11A and 11B show a partial plan view of one example of a conventional liquid crystal light modulating element. FIG. 11A shows pixels (a) and pixel spaces (a1), as well as the principle governing the location of the resin bodies (b) in a low-resolution liquid crystal light modulating element. FIG. 11B shows pixels (a') and pixel spaces (a2) (which are smaller than spaces (a1)), as well as the principle governing the location of the resin bodies (b'), in a high-resolution liquid crystal light modulating element. In FIG. 11B, the pixel space (a2) appears to be essentially the same size as that of the pixel space (a1) in FIG. 11A, with the resin bodies (b) larger than the pixel space (a2). In fact, the pixel space (a2) shown in FIG. 11B is smaller than the pixel space (a1) shown in FIG. 11A, and the pixels (a) and resin bodies (b) shown in FIG. 11A are the same size as the pixels (a') and resin bodies (b') shown in FIG. 11B, respectively.

In the liquid crystal light modulating elements shown in FIGS. 11A and 11B, the resin bodies are located at all of the corners of the square pixels, such that there are resin bodies between each pixel.

However, in a liquid crystal light modulating element of this construction, to make the element high-resolution and high-detail, the resin bodies must be placed with a commensurate degree of density, which entails a lower production efficiency for the element. Moreover, in a high-resolution liquid crystal light modulating element, the space between each pixel (a') becomes narrow, and the resin bodies (b') obstruct the display areas and reduce the effective display rate, as shown in FIG. 11B.

The same problems exist in a multi-layered liquid crystal light modulating element in which the liquid crystal light modulating element is obtained by means of multiple adjacent layers.

SUMMARY OF THE INVENTION

In view of the above-described shortcomings of the conventional liquid crystal light modulating element, the present invention pertains to a liquid crystal light modulating element that has a pair of substrates and a liquid crystal light modulating layer sandwiched between the substrates and in which multiple pixels are aligned in a matrix arrangement, and a multi-layered liquid crystal light modulating element comprising multiple liquid crystal light modulating elements stacked in a layered fashion, wherein increasing the resolution does not reduce the production efficiency for the elements, and a good effective display rate and strength can be maintained.

In order to resolve the problems identified above, the present invention provides:

(1) a liquid crystal light modulating element that has a pair of substrates and a liquid crystal light modulating layer sandwiched between the substrates and in which multiple pixels are aligned in a matrix arrangement, wherein the liquid crystal light modulating layer has a liquid crystal material that performs light modulation, spacers that control the size of the gap between the pair of substrates, and resin bodies that are located inside the light modulation range and support the pair of substrates, and wherein the resin bodies are systematically located according to the principle that (i) they are located in the areas of intersection between the vertical columns and horizontal rows of space between the pixels, but (ii) no resin body is located in at least one of the corners of each pixel, and (2) a multi-layered liquid crystal light modulating element comprising multiple liquid crystal light modulating element layers that have a pair of substrates and a liquid crystal light modulating layer sandwiched between the substrates and in which multiple pixels are aligned in a matrix arrangement, wherein the liquid crystal light modulating layers in each liquid crystal light modulating element layer have a liquid crystal material that performs light modulation, spacers that control the size of the gap between the pair of substrates, and resin bodies that are located inside the light modulation range and support the pair of substrates, and wherein the resin bodies are systematically located in each liquid crystal light modulating layer according to the principle that (i) they are located in the areas of intersection between the vertical columns and horizontal rows of space between the pixels, but (ii) no resin body is located in at least one of the corners of each pixel.

BRIEF DESCRIPTION OF THE DRAWINGS

A more complete understanding of the present invention and its advantages will be apparent from the following Detailed Description taken in conjunction with the accompanying drawings. Throughout the accompanying drawings, like parts are designated by like reference numbers.

FIG. 11A shows the pixels and spaces between the pixels and the principle for the placement of the resin bodies in a low-resolution liquid crystal light modulating element, and FIG. 11B shows the pixels and spaces between the pixels and the principle for the placement of the resin bodies in a high-resolution liquid crystal light modulating element.

DETAILED DESCRIPTION OF THE PREFERRED EMBODIMENTS

Figure 1:
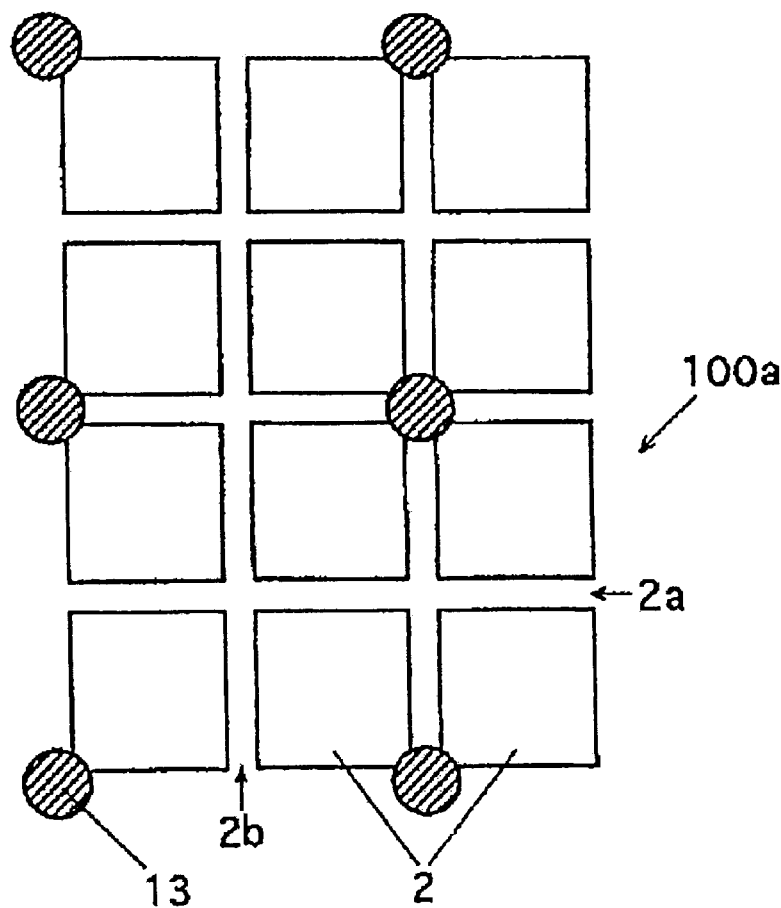
FIG. 1 is a plan view of a part of one example of the liquid crystal light modulating element pertaining to the present invention.

In the liquid crystal light modulating element and in each layer of the multi-layered liquid crystal light modulating element pertaining to this invention, a liquid crystal light modulating layer is sandwiched between a pair of substrates, and multiple pixels are aligned in a matrix arrangement. In the liquid crystal light modulating layer, a liquid crystal material performs light modulation, spacers control the size of the gap between the pair of substrates, and resin bodies support the pair of substrates and are systematically located according to the principle that (i) they are located in the areas of intersection between the vertical columns and horizontal rows of space between the pixels, but (ii) no resin body is located in at least one of the corners of each pixel.

As described above, when resin bodies are located between each pixel, reduction of the effective display rate can be prevented, and when resin bodies are located in the corners of each pixel, i.e., in all of the areas of intersection between the vertical columns and horizontal rows of space between the pixels, the strength can be increased, but in keeping with the increase in resolution, the resin bodies must be arranged in a higher density, and this entails the problems of reduced production efficiency and a lower effective display rate.

However, with the liquid crystal light modulating element and the multi-layered liquid crystal light modulating element pertaining to the present invention, because the resin bodies are systematically located according to the principle that (i) they are located in the areas of intersection between the vertical columns and horizontal rows of space between the pixels, but (ii) no resin body is located in at least one of the corners (normally four) of each pixel, even in a high-resolution element, the increase in the density of the resin bodies can be reduced, thereby preventing the reduction in production efficiency to that extent, while still maintaining a good effective display rate for the element.

In addition, because the pitch between pixels is small when the resolution is increased, the problem of excessive distance between the resin bodies can be reduced, and therefore good strength with no practical obstacles can be maintained.

In terms of each individual pixel, at least one of the corners does not have a resin body, or none of the corners has a resin body.

In the liquid crystal light modulating element and each liquid crystal light modulating element layer of the multi-layered liquid crystal light modulating element pertaining to this invention, the specific rules governing the placement of the resin bodies may be as follows, for example:

(1) The resin bodies may be placed along lines that are parallel to the alignment of the pixels, at intervals that are an exact multiple of the pixel pitch (twice the pixel pitch or higher is preferred); or, (2) The resin bodies may be placed along lines that are diagonal to the alignment of the pixels, at intervals that are an exact multiple of the diagonal pixel pitch (twice the pixel pitch or higher is preferred).

The placement rules (1) and (2) provided above may be combined.

In any event, in the multi-layered liquid crystal light modulating element pertaining to the present invention, the resin bodies in each liquid crystal light modulating element layer may be placed such that they appear to overlap between adjoining liquid crystal light modulating element layers when seen from the direction perpendicular to the light modulating surface of the multi-layered liquid crystal light modulating element, or they may be placed such that they appear offset relative to each other between adjoining liquid crystal light modulating element layers when seen from the direction perpendicular to the light modulating surface of the multi-layered liquid crystal light modulating element.

In a multi-layered liquid crystal light modulating element in which the resin bodies in each liquid crystal light modulating element layer are placed such that they appear to overlap between adjoining liquid crystal light modulating element layers when seen from the direction perpendicular to the light modulating surface of the multi-layered liquid crystal light modulating element, because the resin bodies overlap each other between adjoining liquid crystal light modulating element layers when seen from said direction, the effective display rate of the multi-layered liquid crystal light modulating element is increased and the obstruction to the field of view posed by the resin bodies is reduced, thereby improving display quality. This feature is particularly useful where the resin bodies account for a large proportion of the display area of each liquid crystal light modulating element layer. It is also particularly useful when the resin bodies must be placed close together in order to obtain sufficient element strength where the pixels are large (i.e., where the element has a low resolution), and good display quality may be ensured in this case as well. In the multi-layered liquid crystal light modulating element, the pixel pitch in each liquid crystal light modulating element layer should preferably be 300 $\mu$m or greater, in view of the need to preserve good display quality where there are more resin bodies than there are pixels.

In a multi-layered liquid crystal light modulating element in which the resin bodies in each liquid crystal light modulating element layer are placed such that they appear offset relative to each other between adjoining liquid crystal light modulating element layers when seen from the direction perpendicular to the light modulating surface of the multi-layered liquid crystal light modulating element, because the variations in the height of the resin bodies in each liquid crystal light modulating element layer average out across multiple liquid crystal light modulating element layers, variations in the thickness of the multi-layered liquid crystal light modulating element may be reduced, and unevenness in display due to variations in the thickness of the element may be eliminated to that extent. In addition, even where the resolution is increased, if the resin bodies are made to account for a small proportion of the display area, the resin bodies become inconspicuous, and become increasingly inconspicuous in the second, third and subsequent liquid crystal light modulating element layers because they are hidden by the upper layers. Therefore, even where the resin bodies in each liquid crystal light modulating element layer are placed such that they appear offset relative to each other between adjoining liquid crystal light modulating element layers when seen from the direction perpendicular to the light modulating surface of the multi-layered liquid crystal light modulating element, the overall strength of the element is not affected, and good display quality may be maintained. This feature is particularly useful when the resin bodies must be placed far apart in order to obtain sufficient display quality where the pixels are small (i.e., where the element has a high resolution), and good element strength may be preserved in this case as well. In this multi-layered liquid crystal light modulating element, the pixel pitch in each liquid crystal light modulating element layer should preferably be 300 $\mu$m or less, in view of the need to preserve good element strength and display quality where there are fewer resin bodies than there are pixels.

At least one of the two substrates in the liquid crystal light modulating element and in each liquid crystal light modulating element layer of the multi-layered liquid crystal light modulating element pertaining to this invention is transparent. For the transparent substrate, a glass substrate may be used, but it may also be made from a flexible material such as polycarbonate, polyether sulfone (PES), polyethylene terephthalate, or other materials.

The liquid crystal light modulating element and each liquid crystal light modulating element layer of the multi-layered liquid crystal light modulating element pertaining to this invention may be used as a reflective element or an optical writing element. In this case, it is not always necessary for one of the two substrates to be transparent. In addition, where necessary, electrodes formed from a transparent inductive film such as ITO (indium tin oxide), or from a metal such as aluminum or silicon may be formed on the substrate, or a photoconductive film such as amorphous silicon or Bismuth Silicon Oxide $Bi_{12}SiO_{20}$ (BSO) may be formed on the substrate and used as electrodes to control the liquid crystal light modulating element. Furthermore, in addition to the formation of these electrodes on the substrate, the electrode material itself may be used as the substrate material, such that it works as the substrate and electrodes. One possible construction of the electrodes is an active matrix-type electrode construction in which multiple pixel electrodes are formed together with thin film transistors.

It is also acceptable if a liquid crystal material orientation film such as polyimide is formed on the surface of the electrodes if necessary. This orientation film may be subjected to rubbing if necessary. By doing so, the liquid crystal molecules may be aligned in any desired direction. Furthermore, any organic or inorganic film may be applied to the electrode surface as a gas barrier or an insulating barrier, increasing the reliability of the element.

Possible types of liquid crystal materials that may be used as the liquid crystal light modulating element and each liquid crystal light modulating element layer in the multi-layered liquid crystal light modulating element pertaining to this invention include twisted nematic liquid crystal material, super-twisted nematic liquid crystal material, cholesteric nematic phase transition liquid crystal material, liquid crystal material comprising a nematic liquid crystal material, such as cholesteric liquid crystal having a visible selective reflection wavelength, to which a chiral agent is added, or a ferroelectric or anti-ferroelectric liquid crystal material that exhibits a smectic phase at room temperature.

In order to efficiently perform transmission and blocking of light using the birefringence of the liquid crystal, both surfaces of the liquid crystal light modulating element and the multi-layered liquid crystal light modulating element pertaining to the present invention may have a polarizing plate and a phase difference plate. Where the liquid crystal light modulating element pertaining to the present invention is to be used as a color display, a color filter or a dichroic coloring agent may be added. In the multi-layered liquid crystal light modulating element pertaining to the present invention, multiple liquid crystal light modulating element layers may be combined to form a color display element.

Materials that may be used as the material for the spacers that control the gaps between the substrates in the liquid crystal light modulating element and each liquid crystal light modulating element layer of the multi-layered liquid crystal light modulating element pertaining to the present invention include inorganic substances such as refined glass fiber, silicate glass balls or alumina powder, or spherical particles of organic compounds such as divinyl benzene bridging polymer or polystyrene bridging polymer. Methods that may be used to apply these powders in the present invention include methods in which they are applied to the substrate by means of dry dispersion, wet dispersion, dipping, open-air bonding, etc., the method described below in which the resin bodies are combined with the spacers at the time they are formed, and the method in which the resin bodies are formed on the substrate to which the spacers are bonded, and the spacers are embedded in the resin bodies when the resin bodies are pressed onto the substrate. Where uniform application of the spacers is difficult, such as when a large element is being prepared, the method in which the spacers are combined with the resin bodies at formation is preferred.

For the high-polymer material comprising the resin bodies located in the light modulation range in the liquid crystal light modulating element and each liquid crystal light modulating element layer of the multi-layered liquid crystal light modulating element pertaining to the present invention, any organic substance that has the appropriate elasticity and does not react chemically with the liquid crystal material may be used. Materials that can be used for the resin bodies include thermoplastic resins, heat-hardened resins or UV-hardened resins. Thermoplastic resins include polyvinyl chloride resin, polyvinylidene chloride resin, polyvinyl acetate resin, polymethacryl resin, polyacrylic ester resin, polystyrene resin, polyamide resin, polyethylene resin, polyurethane resin, polypropylene resin, fluororesin, polyacrylonitrile resin, polyvinyl ether resin, polyvinyl ketone resin, polyether resin, polycarbonate resin, polyether chloride resin, polyvinyl pyrolidone resin, and saturated polyester resin. Moreover, two or more of these resins may be combined.

Heat-hardened resins include epoxy resin, phenol resin, polyester resin, polyimide resin, polyamideimide resin and silicone resin, while UV-hardened resins include acrylic resins and methacrylic resins, for example. These may be used individually or combined. Naturally, thermoplastic resins, heat-hardened resins and UV-hardened resins may also be used in combination.

To avoid concentration or uneven alignment of these resin bodies that are seen with conventional dispersion-type spacers, the resin bodies are systematically located according to the principle that: (i) they are located in the areas of intersection between the vertical columns and horizontal rows of space between the pixels, but (ii) no resin body is located in at least one of the corners of each pixel. The method of applying these resin bodies may be printing using a screen or a metal mask, or a method in which an appropriate amount of resin bodies are expelled onto the substrate via the dispenser method or the inkjet method.

An example of the manufacturing method for the liquid crystal light modulating element and the liquid crystal light modulating element layers of the multi-layered liquid crystal light modulating element pertaining to the present invention will be explained below.

Where the resin bodies are formed using a thermoplastic high-polymer material, after the viscosity of the thermoplastic high-polymer material is adjusted by adding an appropriate amount of an organic solvent to the thermoplastic high-polymer material, resin bodies, of which the thermoplastic high-polymer material forms the principal component, are formed on one substrate of the pair of substrates. When doing so, if an appropriate quantity of gap-regulating spacers is added to the viscosity-adjusted thermoplastic high-polymer material, spacers may be incorporated in the formed resin bodies. These resin bodies become strong when the viscosity-adjusting solvent is evaporated following formation of the resin bodies on one of the substrates.

Subsequently, the other substrate is placed on top of the substrate on which the resin bodies were formed. Where substrates on which electrodes are formed are used as the pair of electrodes, the substrates are stacked with the electrode surfaces facing each other. While this is done, by heating and pressing together the pair of substrates at a temperature equal to or greater than the softening temperature of the thermoplastic high-polymer material, the resin bodies are compressed to the desired height and are bonded to the surfaces of the substrates. Strong resin bodies that bond and support both substrates are then obtained by cooling the pair of substrates to a temperature lower than the softening temperature of the thermoplastic high-polymer material.

Where resin bodies are formed using a resin material that hardens by light or heat, a material that softens when heated at or above a prescribed temperature after it is hardened should be used. After placing the resin material in the manner described above, it is hardened by being heated or irradiated with light and formed into resin bodies. The other substrate is then placed over the first, and the substrates are heated and pressed together so that they bond together.

Methods to place the liquid crystal material in the liquid crystal light modulating layer include a method in which the liquid crystal material is provided to one of the two substrates through dripping before the two substrates are heated and pressed together, and a method in which the liquid crystal material is injected between the two substrates after they are heated and pressed. In the process in which the liquid crystal material is dropped onto one substrate and spreads to the entire surface of the substrate before the two substrates are heated and pressed together, and in the process in which the liquid crystal material is injected between the two substrates, the liquid crystal material should be kept in the isotropic phase in order to prevent unevenness in the orientation of the liquid crystal material. In doing so, if the softening temperature of the thermoplastic high-polymer material is lower than the phase transition temperature of the liquid crystal material, misalignment occurs if external force is applied to the resin bodies while this process is being performed. If the softening temperature of the thermoplastic high-polymer material is higher than the temperature of the pair of substrates, both substrates may become warped when the substrates are heated and pressed together. Therefore, it is desired that the softening temperature of the thermoplastic high-polymer material be higher than the temperature at which transition of the liquid crystal material to an isotropic phase occurs, but lower than the softening temperature of the substrates.

Various embodiments of the present invention will be explained next with reference to the drawings.

Figure 2:
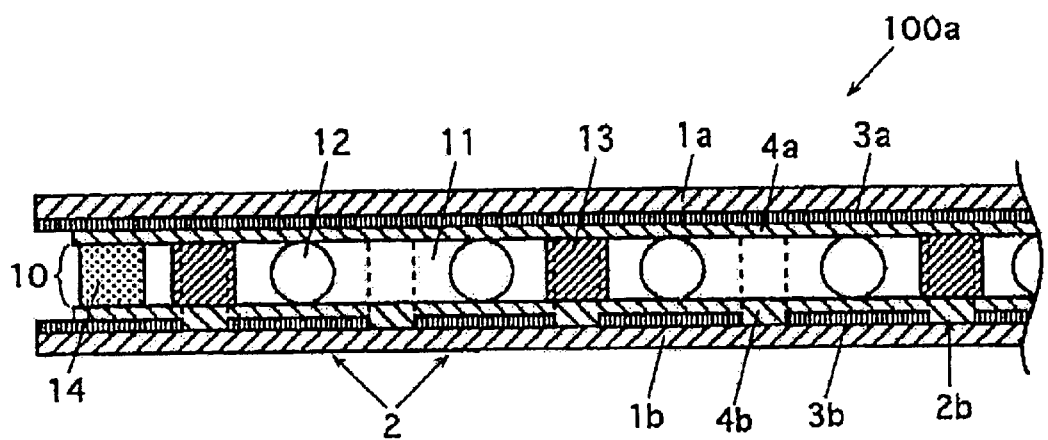
FIG. 2 is a cross-section of a part of the liquid crystal light modulating element shown in FIG. 1.
Figure 3:
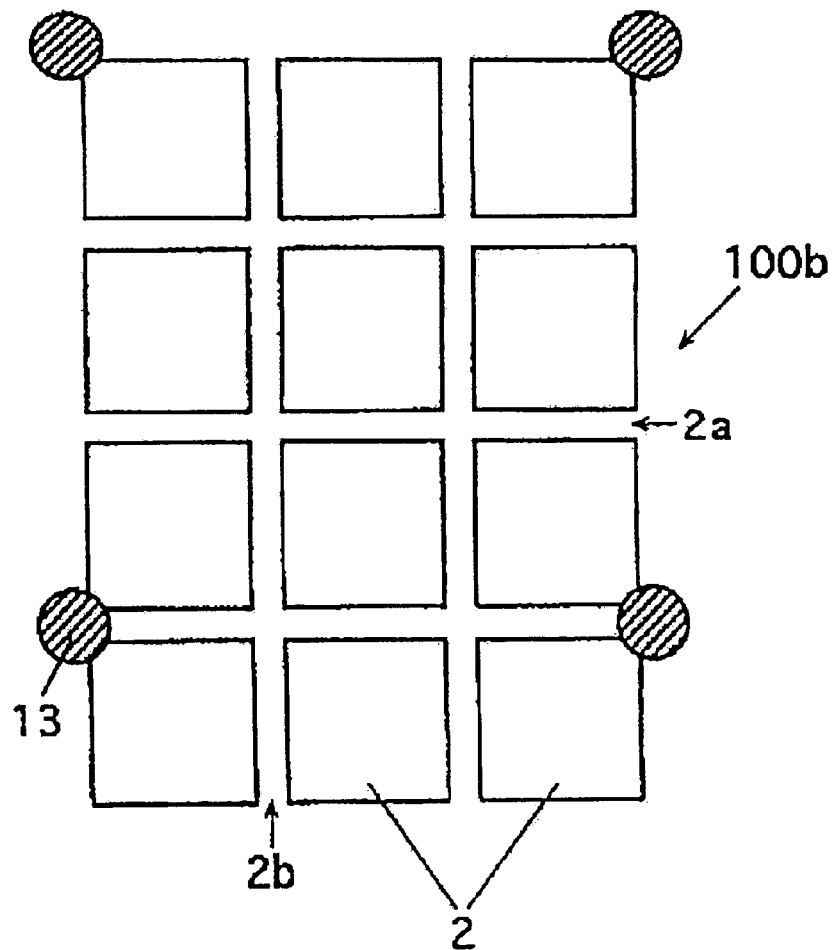
FIG. 3 is a plan view of a part of one example of the liquid crystal light modulating element pertaining to the present invention.
Figure 4:
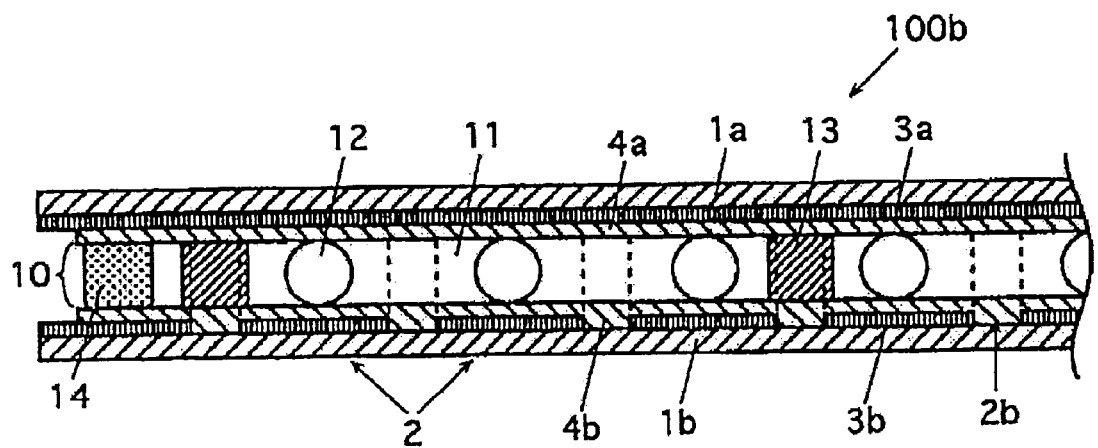
FIG. 4 is a cross-section of a part of the liquid crystal light modulating element shown in FIG. 3.

FIGS. 1 and 3 are each plan views of a part of one example of the liquid crystal light modulating element pertaining to the present invention, while FIGS. 2 and 4 are each cross-sections of a part of the liquid crystal light modulating element shown in FIGS. 1 and 3, respectively. In FIGS. 1 and 3, the substrates, electrodes, orientation film, liquid crystal material, spacers, sealing resin, etc., are omitted from the drawings for the sake of clarity.

The liquid crystal light modulating element 100a shown in FIGS. 1 and 2, and the liquid crystal light modulating element 100b shown in FIGS. 3 and 4, perform so-called simple matrix driving. As shown in FIGS. 2 and 4, liquid crystal light modulating elements 100a and 100b have a pair of substrates 1a and 1b, at least one of which is transparent, as well as a liquid crystal light modulating layer 10 sandwiched in between the two substrates 1a and 1b, and multiple pixels 2 arranged in a matrix arrangement. Here, transparent substrates are used for both substrates 1a and 1b.

The liquid crystal light modulating layer 10 has a liquid crystal material 11 that performs light modulation, spacers 12 that control the gap between the substrates 1a and 1b, and resin bodies 13 having a thermoplastic high-polymer material as their principal component, which are located in the light modulation range and keep the substrates 1a and 1b bound to each other.

As shown in FIGS. 2 and 4, multiple belt-shaped transparent electrodes 3a and 3b are formed on the substrates 1a and 1b, respectively, such that they are distanced from each other at prescribed intervals, and the electrodes 3a and 3b intersect. The points at which the electrodes 3a and 3b intersect in a matrix arrangement comprise the display pixels 2. Orientation films 4a and 4b are formed on the electrodes 3a and 3b, respectively. The spacers 12 are located between the substrates 1a and 1b, and regulate the gap between the two substrates. Sealing resin 14 is placed around the edges of the substrates 1a and 1b to prevent leakage of the liquid crystal material 11.

As shown in FIGS. 1 and 3, the resin bodies 13 are systematically located such that (i) they are located in the areas of intersection between the vertical columns 2a and horizontal rows 2b of space between the pixels 2, but (ii) there are only up to three resin bodies located at the corners of each pixel. Here, the resin bodies 13 are placed along lines that are parallel to the alignment of the pixels 2, at intervals that are an exact multiple of the pitch of the pixels 2, with a minimum pitch of twice the pixel pitch (twice the pixel pitch in the example of FIG. 1, and three times the pixel pitch in the example of FIG. 3).

Changing the perspective, the resin bodies 13 are arranged along lines that are diagonal to the alignment of the pixels, with a pitch that is an exact multiple of the pixel pitch, with a minimum pitch of twice the pixel pitch along the diagonal line.

With these elements 100a and 100b, impressing a prescribed voltage to the liquid crystal material 11 by means of the electrodes 3a and 3b changes the molecular alignment of the liquid crystal material 11 in each pixel 2, thereby performing light modulation.

Figure 11A:
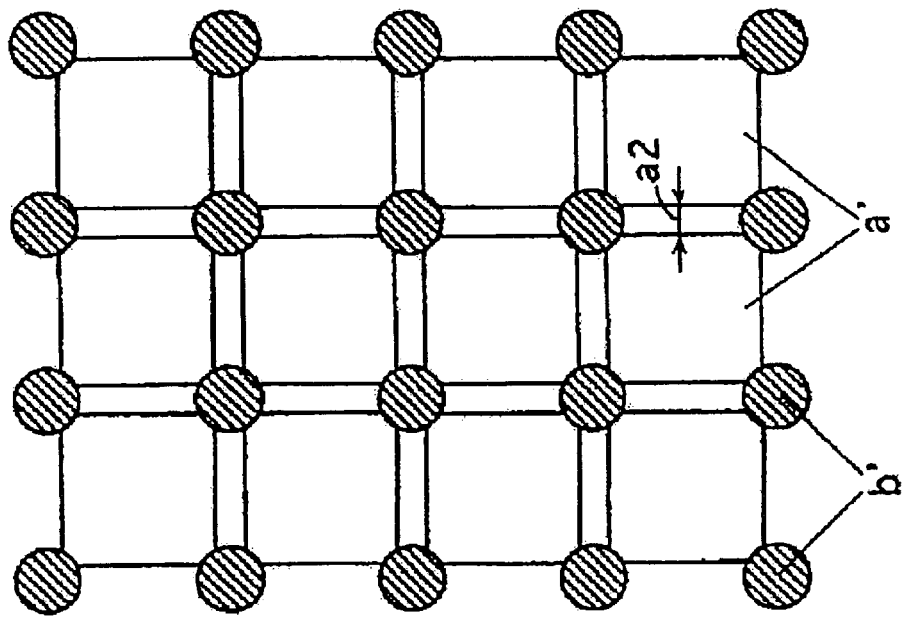
FIGS. 11A and 11B comprise plan views of part of one example of the conventional liquid crystal light modulating element.

As a principle for placement of the resin bodies, in a low-resolution element, i.e., in an element having a large pixel size, as shown in FIG. 11A, the resin bodies (b) may be easily placed at all four corners of each pixel, i.e., at all of the areas at which the horizontal rows and vertical columns of space between the pixels intersect, and because the area consumed by the resin bodies (b) is a sufficiently small percentage of the total display area, a good effective display rate is obtained. If the effective display rate is at least 80% or greater, a sufficiently bright element may be obtained. For example, if the size of a pixel (a) is 900 µm and the width of the gap (a1) between two adjacent pixels (a) is 100 µm, the effective display rate where no resin bodies (b) exist is at least 80%, and even where resin bodies (b) having a diameter of 40 µm are placed at all four corners of each pixel, the resin bodies (b) do not extend beyond the spaces between the pixels (a). Consequently, the effective display rate remains the same.

Figure 11B:
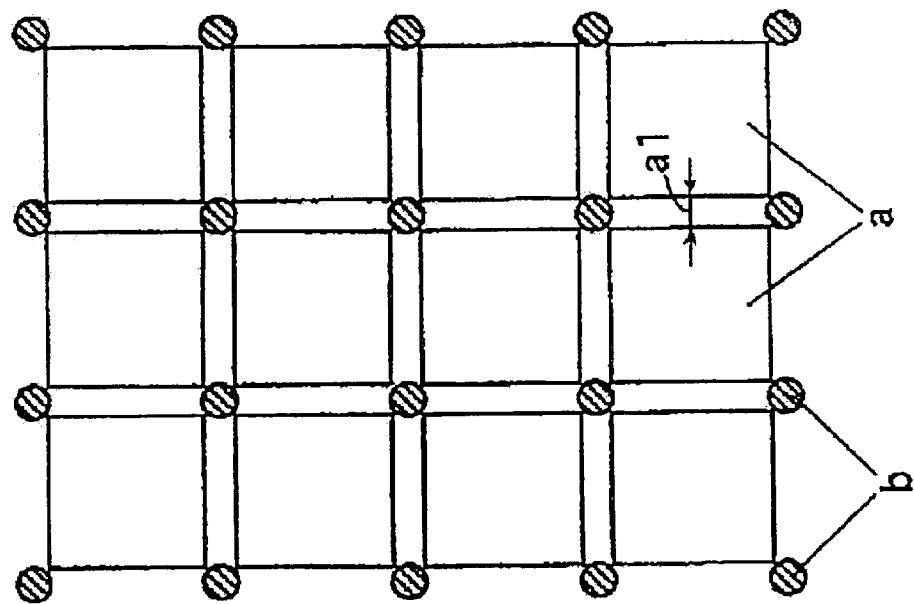

However, as the resolution increases, i.e., as the pixel size becomes smaller, the placement of the resin bodies becomes more difficult, and the effective display rate falls noticeably. For example, as shown in FIG. 11B, where the size of each pixel (a') is 90 µm, and the width of each space (a2) between pixels (a') is 10 µm, the effective display rate where there are no resin bodies (b) is at least 80%, but if resin bodies (b') having a diameter of 40 µm are located at all four corners of each pixel, the resin bodies (b') extend into the area of the pixels (a'). Consequently, the effective display rate falls below 80%.

However, with the liquid crystal light modulating element 100a shown in FIGS. 1 and 2 and the liquid crystal light modulating element 100b shown in FIGS. 3 and 4, because the resin bodies 13 are systematically located according to the principle that (i) they are located in the areas of intersection between the vertical columns 2a and horizontal rows 2b of space between the pixels 2, but (ii) there are no resin bodies 13 at at least one of the four corners of each pixel 2, and here, the resin bodies 13 are located along lines parallel to the matrix alignment of the pixels 2, at intervals that are an exact multiple of the pitch of the pixels 2, even if the resolution is increased, overcrowding of the resin bodies 13 may be prevented, a reduction in element production efficiency may be reduced to that degree, and a good effective display rate may be maintained for the element. In addition, when the resolution is increased, the pitch between the pixels 2 becomes small. Consequently, an increase in the distance between resin bodies 13 may be reduced, and therefore a high level of strength that poses no practical problems may be maintained.

Figure 5:
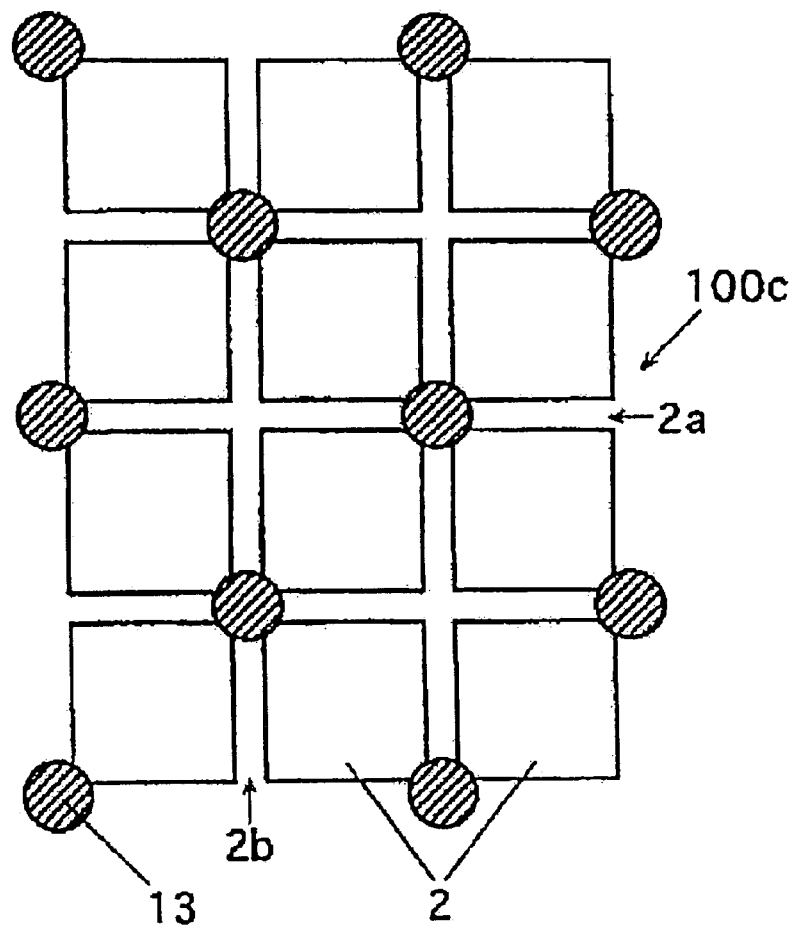
FIG. 5 is a plan view of a part of another example of the liquid crystal light modulating element pertaining to the present invention.
Figure 6:
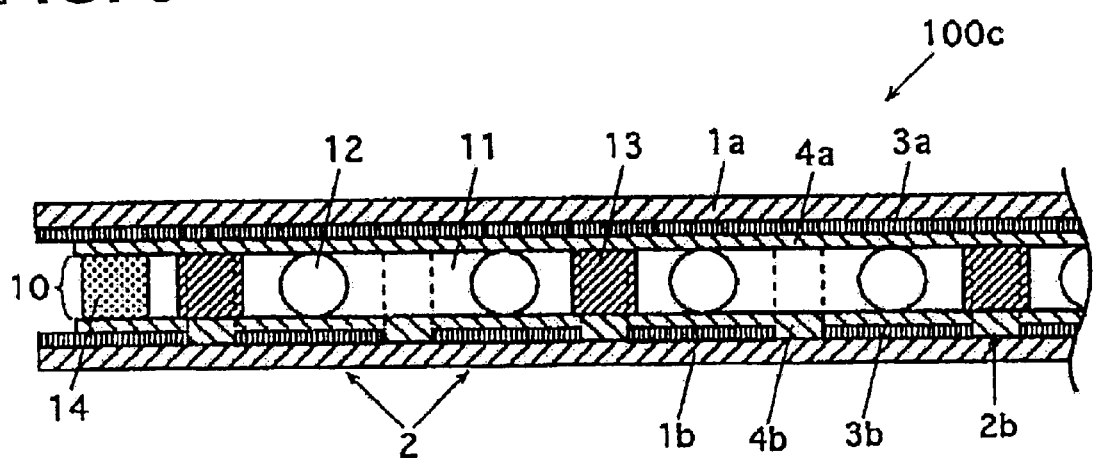
FIG. 6 is a cross-section of a part of the liquid crystal light modulating element shown in FIG. 5.
Figure 7:
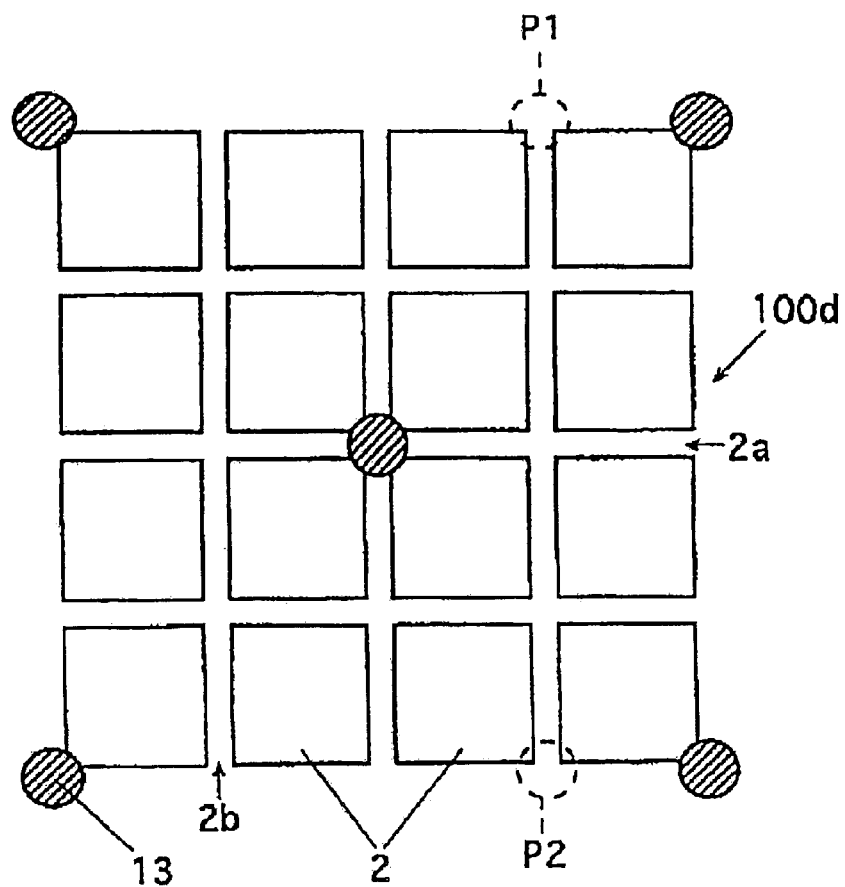
FIG. 7 is a plan view of a part of another example of the liquid crystal light modulating element pertaining to the present invention.
Figure 8:
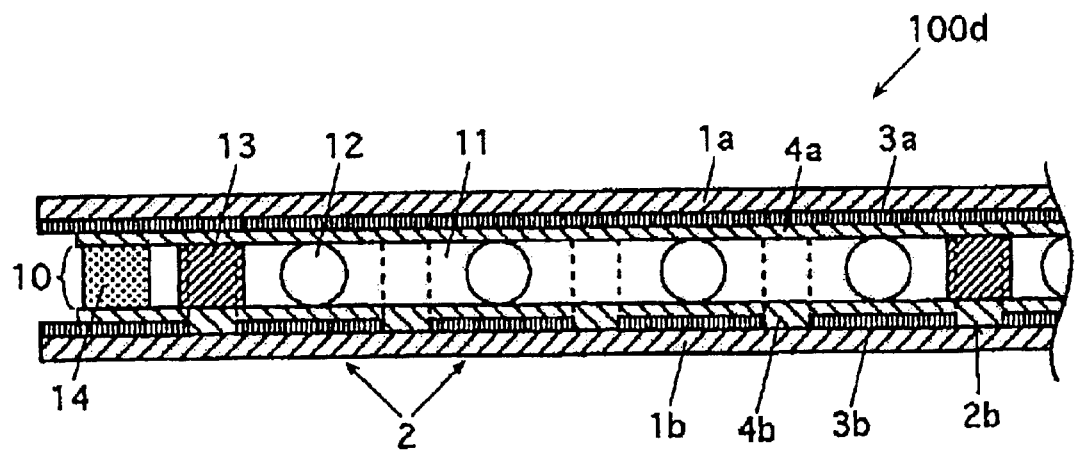
FIG. 8 is a cross-section of a part of the liquid crystal light modulating element shown in FIG. 7.

FIGS. 5 and 7 are each plan views of a part of one example of the liquid crystal light modulating element pertaining to the present invention, while FIGS. 6 and 8 are each cross-sections of a part of the liquid crystal light modulating element shown in FIGS. 5 and 7, respectively. In FIGS. 5 and 7, the substrates, electrodes, orientation film, liquid crystal material, spacers, sealing resin, etc., are omitted from the drawings.

The liquid crystal light modulating element 100c shown in FIGS. 5 and 6 and the liquid crystal light modulating element 100d shown in FIGS. 7 and 8 are the same as the element 100a shown in FIGS. 1 and 2 and the element 100b shown in FIGS. 3 and 4, respectively, except for the principle for the placement of the resin bodies 13. The element 100c shown in FIGS. 5 and 6 and the element 100d shown in FIGS. 7 and 8 will therefore be explained with a focus on the principle governing the placement of the resin bodies 13. Because the other aspects of the elements are the same as previously described, a description of the other elements will not be repeated. Members that have the same construction and functions as in the elements 100*a* and 100*b* have the same reference numbers.

In these elements 100*c* and 100*d*, as shown in FIGS. 5 and 7, the resin bodies 13 are systematically placed such that (i) they are located in the areas of intersection between the vertical columns 2*a* and horizontal rows 2*b* of space between the pixels 2, but (ii) there are no resin bodies 13 in at least one of the four corners of each pixel 2, and here, the resin bodies 13 are placed in lines that are diagonal to the alignment of the pixels 2, at intervals that are an exact multiple of the diagonal pitch of the pixels 2 (the same pixel pitch as in the example of FIG. 5, and twice the pixel pitch present in the example of FIG. 7).

Changing the perspective, the resin bodies 13 are arranged along lines parallel to the matrix alignment, with a pitch that is an exact multiple of the pixel pitch (twice the pixel pitch in FIG. 5, and four times the pixel pitch in FIG. 7).

With these elements 100*c* and 100*d*, impressing a prescribed voltage to the liquid crystal material 11 by means of the electrodes 3*a* and 3*b* changes the molecular alignment of the liquid crystal material 11 in each pixel 2, thereby performing light modulation.

The liquid crystal light modulating element 100*c* shown in FIGS. 5 and 6 and the liquid crystal light modulating element 100*d* shown in FIGS. 7 and 8 offer the same benefits as the liquid crystal light modulating element 100*a* shown in FIGS. 1 and 2 and the liquid crystal light modulating element 100*b* shown in FIGS. 3 and 4, and using the principle for the placement of the resin bodies 13 of the element 100*c*, the distance between the resin bodies 13 may be made smaller than that obtained by means of the principle for the placement of resin bodies 13 of the element 100*a*, and therefore a stronger element may be obtained. Similarly, using the principle for the placement of the resin bodies 13 of the element 100*d*, a stronger element may be obtained than when using the principle for the placement of the resin bodies 13 of the element 100*b*.

In the element 100*d* shown in FIGS. 7 and 8, a placement method may also be used in which the positions of the resin bodies at the upper right corner and the lower right corner of FIG. 7 are moved to the positions P1 and P2, respectively, in order to further increase the strength of the element.

Other embodiments of the present invention will now be explained with reference to FIGS. 9 and 10.

Figure 9:
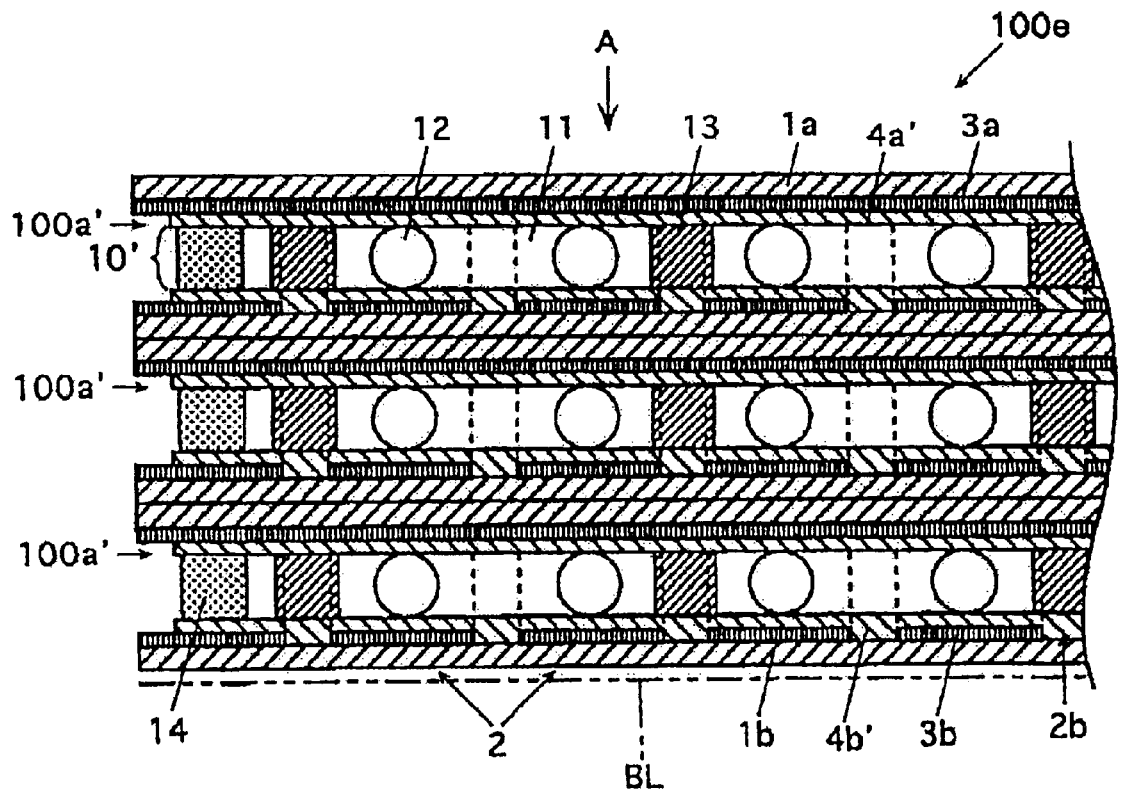
FIG. 9 is a cross-section of a part of one example of the multi-layered liquid crystal light modulating element pertaining to the present invention.
Figure 10:
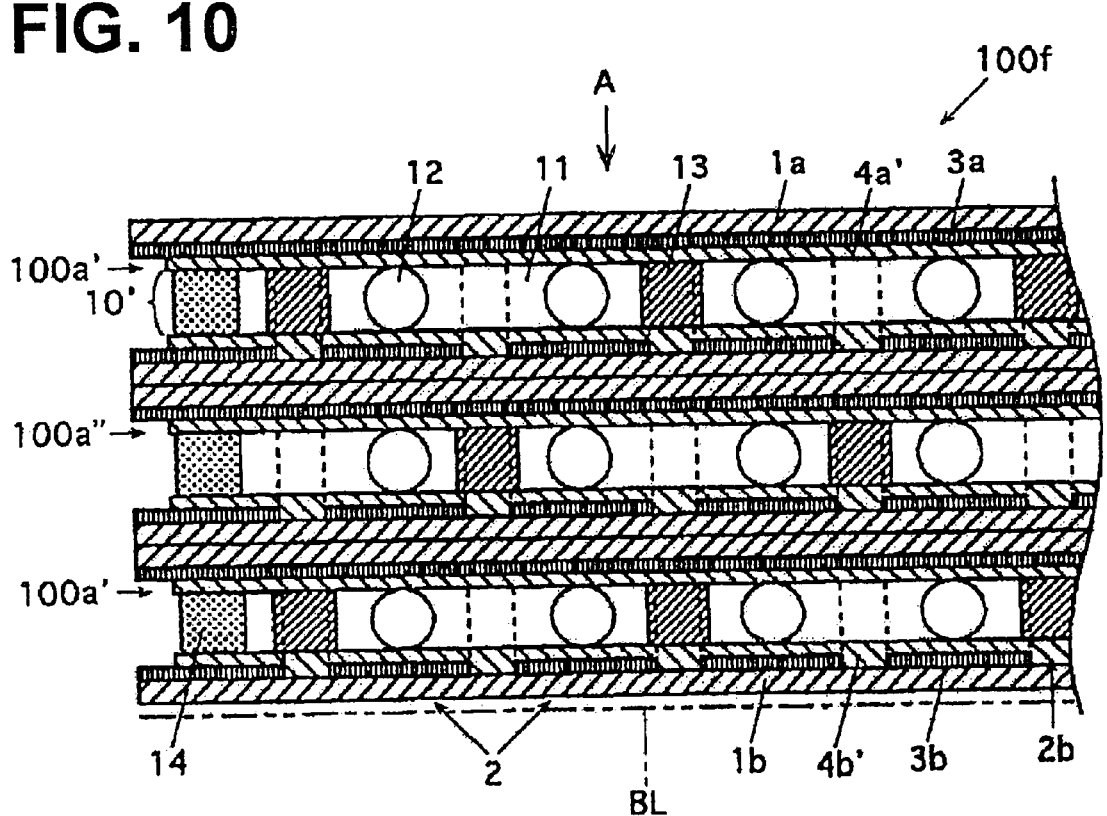
FIG. 10 is a cross-section of a part of one example of the multi-layered liquid crystal light modulating element pertaining to the present invention.

FIGS. 9 and 10 are partial cross-sections of examples of the multi-layered liquid crystal light modulating element pertaining to the present invention.

The multi-layered liquid crystal light modulating element 100*e* shown in FIG. 9 and the multi-layered liquid crystal light modulating element 100*f* shown in FIG. 10 are multi-layered liquid crystal light modulating elements comprising multiple liquid crystal light modulating element layers 100*a*′ and/or 100*a*″, in which the orientation films 4*a* and 4*b* of the liquid crystal light modulating element 100*a* shown in FIGS. 1 and 2 are replaced with insulating films 4*a*′ and 4*b*′, respectively.

Each liquid crystal light modulating element layer 100*a*′ or 100*a*″ of the multi-layered liquid crystal light modulating element 100*e* or 100*f* has a pair of transparent substrates 1*a* and 1*b* and a liquid crystal light modulating layer 10′ sandwiched between the substrates 1*a* and 1*b*, and the multiple pixels 2 are aligned in a matrix arrangement.

The liquid crystal light modulating layer 10′ has a liquid crystal material 11 that performs light modulation, spacers 12 that regulate the distance of the gap between the substrates 1*a* and 1*b*, and resin bodies 13, of which a thermo-plastic high-polymer material forms the principal component, and which are located within the light modulation range and serve as an adhesive to bond and support the substrates 1*a* and 1*b*. If each liquid crystal light modulating element layer performs display of different colors, the entire multi-layered element can perform color display. For example, if liquid crystal light modulating element layers that display blue, green and red, respectively, are layered, with each layer using a liquid crystal material that exhibits a cholesteric phase, and a light absorbing layer is placed on the back, color display may be performed. In this case, the selective reflection wavelength of the liquid crystal may be adjusted by using a chiral nematic liquid crystal as the liquid crystal material and by changing the amount of the added chiral agent in each layer.

Each substrate 1*a* and 1*b* has multiple belt-shaped transparent electrodes 3*a* and 3*b*, respectively, that are aligned at prescribed intervals, and the electrodes 3*a* and 3*b* are aligned such that they intersect with each other. The points in the matrix formed by the intersecting electrodes 3*a* and 3*b* comprise the display pixels 2. Insulating films 4*a*′ and 4*b*′ are formed on the electrodes 3*a* and 3*b*, respectively. Spacers 12 are located between the substrates 1*a* and 1*b*, determining the distance between the substrates. Sealing resin 14 is located around the edges of the substrates 1*a* and 1*b* in order to prevent the liquid crystal material 11 from leaking out.

The resin bodies 13 are systematically placed such that they are located according to the principle that (i) they are located in the areas of intersection between the vertical columns 2*a* and horizontal rows 2*b* of space between the pixels 2, but (ii) no resin body is located in at least one of the four corners of each pixel 2. In these examples, the resin bodies 13 are located along lines parallel to the matrix alignment of the pixels 2, at intervals of twice the pitch of the pixels 2 in the matrix alignment. In these examples, for the elements 100*e* and 100*f*, the pixel pitch in each liquid crystal light modulating element layer is 350 μm.

In the multi-layered liquid crystal light modulating element 100*e*, as shown in FIG. 9, the resin bodies 13 in each liquid crystal light modulating element layer 100*a*′ are placed such that they appear to overlap between adjoining liquid crystal light modulating element layers 100*a*′ when seen from the direction perpendicular to the light modulating surface of the element 100*e* (the direction indicated by the arrow A in FIG. 9), and in the multi-layered liquid crystal light modulating element 100*f*, as shown in FIG. 10, the resin bodies 13 in each liquid crystal light modulating element layer 100*a*′ and 100*a*″ are placed such that they appear offset relative to each other between adjoining liquid crystal light modulating element layers 100*a*″ and 100*a*′ when seen from the direction perpendicular to the light modulating surface of the element 100*f* (the direction indicated by the arrow A in FIG. 10).

In the multi-layered liquid crystal light modulating element 10*e* shown in FIG. 9, because the resin bodies 13 are placed such that they appear to overlap between adjoining liquid crystal light modulating element layers 100*a*′ when seen from the direction A perpendicular to the light modulating surface of the element 100*e*, the effective display rate of the multi-layered liquid crystal light modulating element 100*e* increases and the obstruction of the field of view by the resin bodies 13 is kept to a minimum, thereby increasing display quality. An element of this type is particularly advantageous when the area occupied by the resin bodies is large relative to the display area of each liquid crystal light modulating element layer 100*a*′.

In the multi-layered liquid crystal light modulating element 100*f* shown in FIG. 10, because the variations in the height of the resin bodies 13 in each liquid crystal light modulating element layer 100a' and 100a" (mainly due to variations occurring during manufacturing of the resin bodies 13) average out across adjoining liquid crystal light modulating element layers 100a' and 100a", variations in the thickness of the multi-layered liquid crystal light modulating element 100f may be reduced, and unevenness in display due to variations in the thickness of the element 100f may be eliminated to that extent. In addition, even where the resolution is increased, if the resin bodies 13 are made to account for a small proportion of the display area, the resin bodies 13 become inconspicuous, and become increasingly inconspicuous in the second, third and subsequent liquid crystal light modulating element layer because they are hidden by the upper layers. Therefore, even where the resin bodies 13 in each liquid crystal light modulating element layer 100a' and 100a" are placed such that they appear offset relative to each other between adjoining liquid crystal light modulating element layers 100a" and 100a' when seen from the direction A perpendicular to the light modulating surface of the element 100f, the overall strength of the element is not affected, and good display quality may be maintained.

Specific examples of the liquid crystal light modulating element and multi-layered liquid crystal light modulating element pertaining to the present invention are explained below, together with an explanation of the method of their construction. In addition, as a comparison example, a conventional liquid crystal light modulating element was prepared for purposes of comparison with the element prepared pursuant to the element example (1), and the comparison results are also explained.

ELEMENT EXAMPLE (1)

A liquid crystal light modulating element 100a shown in FIGS. 1 and 2 was prepared using 20 cm square (i.e., 20 cm×20 cm) substrates to perform a strength test and low-temperature environment durability test.

Resin bodies 13 comprising PES-380S30 polyester resin (made by Three Bond) were formed using the screen printing method on a 20 cm square (i.e., 20 cm×20 cm) polyether sulfone substrate 1a (made by Sumitomo Bakelite) having 320 µm-wide ITO electrodes, which were aligned at 30 µm intervals and had a rubbed polyimide orientation film 4a on their surface, such that the resin bodies 13 comprised approximately 40 µm-diameter cylinders and were located at a 700 µm pitch. As shown in FIG. 1, the resin bodies 13 were placed along lines parallel to the matrix alignment of the pixels 2, at intervals of twice the pitch of the matrix alignment of the pixels 2.

Furthermore, hedges of continuous polyester resin (sealing resin) 14 were simultaneously formed on the edges of the substrates 1a. Micro Pearls SP-2065 (manufactured by Sekisui Fine Chemicals), a spacer material, having an approximately 6.5 µm diameter, were uniformly dispersed by means of dry dispersion on the entire area of the substrate 1a as the gap controlling spacers 12, to achieve a density of approximately 200 particles/mm. Using a precision liquid crystal expelling device (dispenser) (manufactured by Musashi Engineering), MLC6068-000 nematic liquid crystal (manufactured by Merck), to which 2.3% by weight of S-811 chiral agent (also manufactured by Merck) was added, was then dropped onto the substrate as the liquid crystal material 11 with the substrate heated to 80° C., which exceeds the isotropic phase transition temperature (70° C.) of the chiral nematic liquid crystal, such that the liquid crystal did not overlap the resin bodies 13.

As the facing substrate 1b, a 20 cm square (i.e., 20 cm×20 cm) polyether sulfone substrate having 320 µm-wide ITO electrodes, which were located at 30 µm intervals, and had a rubbed polyimide orientation film 4b on their surface in the same manner as the electrodes on the substrate 1a, was then placed on the substrate 1a in a vacuum ambience, such that the surfaces with the electrodes faced each other and the twist angle was 250°, and while the substrates were heated at 150° C., which is the temperature at which the polyester resin softens, the substrates were pressed for five minutes under a force of 0.2 kg/cm² and were then cooled down to room temperature under the same pressure to prepare a cell.

A phase difference plate and polarizing plate, which are omitted from the drawings in FIGS. 1 and 2, were located below and above the cell thus obtained in order to obtain the maximum contrast ratio, whereupon an STN liquid crystal light modulating element 100a was obtained.

A 10 kg/cm² external force was applied to the liquid crystal light modulating element 100a obtained in this manner, but no increase or decrease in the distance between the substrates 1a and 1b was seen and no unevenness in display was recognized after the application of the external force was discontinued. No changes in the driving voltage were seen before or after the application of the external force. This element 100a was then left at 0° C. for one hour, but there was no generation of air bubbles. Furthermore, in this element 100a, the area obstructed by the resin bodies 13 was small, and a bright and beautiful screen was achieved.

ELEMENT EXAMPLE (2)

A liquid crystal light modulating element 100a shown in FIGS. 1 and 2 was prepared using 39 cm-long and 30 cm-wide substrates to perform a strength test of the element.

Resin bodies 13 made of PES-380S30 polyester resin (manufactured by Three Bond) were formed using the screen printing method on a polyether sulfone substrate (manufactured by Sumitomo Bakelite) having 320 µm-wide ITO electrodes aligned at 30 µm intervals and with a rubbed polyimide orientation film 4a on their surface, such that the resin bodies 13 comprised approximately 40 µm-diameter cylinders and were located at a 700 µm pitch. For the substrates 1a and 1b, substrates having a 39cm length and 30 cm width were used. As shown in FIG. 1, the resin bodies 13 were placed along lines parallel to the matrix alignment of the pixels 2, at intervals of twice the pitch of the matrix alignment of the pixels 2.

In addition, hedges of continuous polyester resin (sealing resin) 14 were simultaneously formed on the peripheral edges of the substrate 1a. Micro Pearls SP-2065 (manufactured by Sekisui Fine Chemicals), a spacer material, having an approximately 6.5 µm diameter, were uniformly dispersed by means of dry dispersion on the entire area of the substrate 1a as the gap controlling spacers 12, to achieve a density of approximately 200 particles/mm². Using a precision liquid crystal expelling device (dispenser) (manufactured by Musashi Engineering), MLC6068-000 nematic liquid crystal (manufactured by Merck), to which 2.3% by weight of S-811 chiral agent (also manufactured by Merck) was added, was then dropped onto the substrate as the liquid crystal material 11 with the substrate heated to 80° C., which exceeds the isotropic phase transition temperature (70° C.) of the chiral nematic liquid crystal, such that the liquid crystal did not overlap the resin bodies 13.

As the facing substrate 1b, a polyether sulfone substrate having 320 µm-wide ITO electrodes located at 30 µm intervals, and with a rubbed polyimide orientation film 4b on their surface in the same manner as the electrodes on the substrate 1a, was then placed on the substrate 1a in a vacuum ambience, such that the surfaces with the electrodes faced each other and the twist angle was 250°, and while the substrates were heated at 150° C., which is the temperature at which the polyester resin softens, the substrates were pressed for five minutes under a force of 0.2 kg/cm² and were then cooled down to room temperature under the same pressure to prepare a cell.

A phase difference plate and polarizing plate, which are omitted from the drawings in FIGS. 1 and 2, were located below and above the cell thus obtained in order to obtain the maximum contrast ratio, whereupon an STN liquid crystal light modulating element 100a was obtained.

Using the liquid crystal light modulating element 100a prepared in this manner, because the substrates 1a and 1b had a large 39 cm length and 30 cm width, the element was subject to slight warping, but no problems occurred due to the application of the external force, and a bright screen was achieved based on the smaller number of resin bodies 13.

ELEMENT EXAMPLE (3)

A liquid crystal light modulating element 100c shown in FIGS. 5 and 6 was prepared using 39 cm-long and 30 cm-wide substrates to perform a strength test of the element.

The same substrate material, liquid crystal material, spacer material and sealing resin as the element example (2) were used while the size of the substrates 1a and 1b was 39 cm long and 30 cm-wide. The polyester resin bodies 13 comprised approximately 40 μm-diameter cylinders and were placed in the manner shown in FIG. 5. In other words, they were placed along lines that are diagonal to the alignment of the pixels 2, at intervals equal to the diagonal pixel pitch.

The other substrate 1b was placed over the substrate 1a, and the liquid crystal material 11 was injected, whereupon an STN liquid crystal light modulating element 100c was obtained.

In the liquid crystal light modulating element 100c prepared in this manner, although the obstruction of the field of view caused by the resin bodies 13 was larger than in the element 100a obtained in the element example (2), when a 10 kg/cm² external force was applied to the element 100c, there was no variation in the distance between the substrates 1a and 1b, and no unevenness in display was seen after the application of the external force was discontinued.

ELEMENT EXAMPLE (4)

A liquid crystal light modulating element 100b shown in FIGS. 3 and 4 was prepared using 10 cm-long and 10 cm-wide substrates to perform a strength test and low-temperature environment durability test of the element.

Resin bodies 13 made of PES-380S30 polyester resin (manufactured by Three Bond) were formed using the screen printing method on a 10 cm square (i.e., 10 cm×10 cm) polyether sulfone substrate 1a (manufactured by Sumitomo Bakelite) having 230 μm-wide ITO electrodes, which were aligned at 20 μm intervals and with a rubbed polyimide orientation film 4a on their surface, such that the resin bodies 13 comprised approximately 40 μm-diameter cylinders and were located at a 750 μm pitch. As shown in FIG. 3, the resin bodies 13 were placed along lines parallel to the matrix alignment of the pixels 2, at intervals of three times the pixel pitch in the matrix alignment.

In addition, hedges of continuous polyester resin (sealing resin) 14 were simultaneously formed on the peripheral edges of the substrate 1a. Micro Pearls SP-2065 (manufactured by Sekisui Fine Chemicals), a spacer material, having an approximately 6.5 μm diameter, were uniformly dispersed by means of dry dispersion on the entire area of the substrate 1a as the gap controlling spacers 12, to achieve a density of approximately 200 particles/mm². Using a precision liquid crystal expelling device (dispenser) (manufactured by Musashi Engineering), MLC6068-000 nematic liquid crystal (manufactured by Merck), to which 2.3% by weight of S-811 chiral agent (also manufactured by Merck) was added, was then dropped onto the substrate as the liquid crystal material 11 with the substrate heated to 80° C., which exceeds the isotropic phase transition temperature (70° C.) of the chiral nematic liquid crystal, such that the liquid crystal did not overlap the resin bodies 13.

As the facing substrate 1b, a 10 cm square (i.e., 10 cm×10 cm) polyether sulfone substrate having 230 μm-wide ITO electrodes, which were located at 20 μm intervals and with a rubbed polyimide orientation film 4b on their surface in the same manner as the electrodes on the substrate 1a, was then placed on the substrate 1a in a vacuum ambience, such that the surfaces with the electrodes faced each other and the twist angle was 250°. While the substrates were heated at 150° C., which is the temperature at which the polyester resin softens, the substrates were pressed for five minutes under a force of 0.2 kg/cm² and were then cooled down to room temperature under the same pressure to prepare a cell.

A phase difference plate and polarizing plate, which are omitted from the drawings in FIG. 3 or 4, were located below and above the cell thus obtained in order to obtain the maximum contrast ratio, whereupon an STN liquid crystal light modulating element 100b was obtained.

A 10 kg/cm² external force was applied to the liquid crystal light modulating element 100b prepared in this manner, but no variation in the distance between the substrates 1a and 1b was seen and no unevenness in display was recognized after the application of the external force was discontinued. No changes in the driving voltage were seen before or after the application of the external force. This element 100b was then left at 0° C. for one hour, but there was no generation of air bubbles. Furthermore, in this element 100b, the area obstructed by the resin bodies 13 was small, and a bright and beautiful screen was achieved.

ELEMENT EXAMPLE (5)

A liquid crystal light modulating element 100d shown in FIGS. 7 and 8 was prepared using 39 cm-long and 30 cm wide substrates to perform a strength test of the element.

The same substrate material, liquid crystal material, spacer material and sealing resin as in the element example (2) were used, while the substrates 1a and 1b were 39 cm-long and 30 cm-wide. The polyester resin bodies 13 comprised approximately 40 μm cylinders, and were placed in the manner shown in FIG. 7. In other words, they were placed along lines that are diagonal to the alignment of the pixels 2, at intervals of twice the diagonal pixel pitch.

The other substrate 1b was placed over the substrate 1a, and the liquid crystal material 11 was injected, whereupon an STN liquid crystal light modulating element 100d was obtained.

When a 10 kg/cm² external force was applied to the liquid crystal light modulating element 100d prepared in this manner, there was no variation in the distance between the substrates 1a and 1b, and no unevenness in display was seen after the application of the external force was discontinued.

ELEMENT EXAMPLE (6)

A multi-layered liquid crystal light modulating element 100e shown in FIG. 9 was prepared to determine whether a multi-layered liquid crystal light modulating element having good display quality would be obtained.

In other words, resin bodies 13 made of PES-360S30 polyester resin (manufactured by Three Bond) were formed using the screen printing method on a 20 cm square (i.e., 20 cm×20 cm) glass substrate having 320 $\mu$m-wide ITO patterned electrodes, which were aligned a t 30 $\mu$m intervals and were covered by silicone oxide insulating film 4a', such tha t the resin bodies 13 comprised approximately 40 $\mu$m-diameter cylinders and were located at a 700 $\mu$m pitch. The resin bodies 13 were placed along lines parallel to the matrix alignment of the pixels 2, at intervals that were twice the pixel pitch in the matrix alignment.

In addition, hedges of continuous polyester resin (sealing resin) 14 were simultaneously formed on the peripheral edges of the substrate 1a while leaving a liquid crystal injection inlet. Micro Pearls SP-2075 (manufactured by Sekisui Fine Chemicals), a spacer material, having an approximately 7.5 $\mu$m diameter, were uniformly dispersed through dry dispersion on the entire area of the substrate 1a as the gap controlling spacers 12 in order to achieve a density of approximately 100 particles/mm².

As the facing substrate 1b, a glass substrate having 320 $\mu$m-wide ITO patterned electrodes, which were located at 30 $\mu$m intervals and were covered by insulating film 4b', was placed on the substrate 1a. While the substrates were heated at 150° C., which is the temperature at which the polyester resin softens, the substrates were pressed together for five minutes with a 0.2 kg/cm² force and were then cooled down to room temperature under the same pressure to prepare a cell. As the liquid crystal material 11, E-31LV nematic liquid crystal (TN-I=61.5° C., manufactured by Merck), to which 28% by weight of chiral agent S-811 (also manufactured by Merck) was added, was then injected between the substrates in a vacuum ambience after being heated to 60° C. The injection inlet was then closed off by means of Photorec A-704-60 UV-hardened resin (manufactured by Sekisui Fine Chemicals), whereupon a cholesteric liquid crystal light modulating element 100a' that exhibited blue reflection light at a selective reflection wavelength of 480 nm was obtained.

A liquid crystal light modulating element 100a' for green display, the selective reflection wavelength of which was 550 nm, and a liquid crystal light modulating element 100a for red display, the selective reflection wavelength of which was 680 nm, were also prepared using the same procedure, except that the amount of the chiral agent added w as changed to 24.5% and 20% by weight, respectively.

The elements 100a' prepared in this manner were stacked together in the order of blue, green and red liquid crystal light modulating elements layers, and a light absorbing layer BL was placed at the back of the liquid crystal light modulating element for red display, whereupon a multi-layered liquid crystal light modulating element 100e was obtained.

The resin bodies 13 of each liquid crystal light modulating element layer 100a' were placed such that the resin bodies 13 in each liquid crystal light modulating element layer 100a appeared to overlap between adjoining liquid crystal light modulating element layers 100a' when seen from the direction A perpendicular to the light modulating surface of the element 100e, as shown in FIG. 9.

Using the multi-layered liquid crystal light modulating element 100e prepared in this way, there was no reduction in the effective display rate due to the resin bodies 13, and a good display quality was realized.

ELEMENT EXAMPLE (7)

A multi-layered liquid crystal light modulating element 100f shown in FIG. 10 was prepared in order to determine whether a multi-layered liquid crystal light modulating element with good display quality would be obtained.

Resin bodies 13 made of PES-360S30 polyester resin (manufactured by Three Bond) were formed via screen printing method on a 20 cm square (i.e., 20 cm×20 cm) glass substrate having 320 $\mu$m-wide ITO patterned electrodes, which were aligned at 30 $\mu$m intervals and were covered by silicone oxide insulating film 4a', such that the resin bodies 13 comprised approximately 40 $\mu$m-diameter cylinders and were located at a 700 $\mu$m pitch. The resin bodies 13 were placed along lines parallel to the matrix alignment of the pixels 2, at intervals that were twice the pixel pitch in the matrix alignment.

In addition, hedges of continuous polyester resin (sealing resin) 14 were simultaneously formed on the peripheral edges of the substrate 1a while leaving a liquid crystal injection inlet. Micro Pearls SP-2075 (by Sekisui Fine Chemicals), a spacer material, having an approximately 7.5 $\mu$m diameter, were uniformly dispersed through dry dispersion on the entire area of the substrate 1a as the gap controlling spacers 12 to achieve a density of approximately 100 particles/mm².

As the facing substrate 1b, a glass substrate having 320 $\mu$m-wide ITO patterned electrodes, which were located at 30 $\mu$m intervals and were covered by insulating film 4b', was placed on the substrate 1a, and while the substrates were heated at 150° C., which is the temperature at which the polyester resin softens, the substrates were pressed for five minutes under a 0.2 kg/cm² force and were then cooled down to room temperature under the same pressure to prepare a cell. As the liquid crystal material 11, E-31LV nematic liquid crystal (TN-I=61.5° C., manufactured by Merck), to which 28% by weight of S-811 chiral agent (also manufactured by Merck) was added, was then injected between the substrates in a vacuum ambience after being heated to 60° C. The injection inlet was then closed off by means of Photorec A-704-60 UV-hardened resin (manufactured by Sekisui Fine Chemicals), whereupon a cholesteric liquid crystal light modulating element 100a' that exhibited blue reflection light at a selective reflection wavelength of 480 nm was obtained.

A liquid crystal light modulating element layer 100a' for red display, the selective wavelength of which was 680 nm, was prepared using the same procedure, except that the amount of the chiral agent added was changed to 20% by weight. Further, a liquid crystal light modulating element layer 100a" for green display was prepared, in which the amount of the chiral agent added was changed to 24.5% by weight, creating a selective reflection wavelength of 550 nm, and each resin body 13 was placed so as to be offset by one pixel in the direction of the matrix alignment of the pixels 2 relative to the placement principle for the resin bodies shown in FIG. 1.

The three elements prepared in this way were stacked together in the order of element 100a' for blue display, element 100a" for green display and element 100a' for red display, and a light absorbing layer BL was placed at the back of the liquid crystal light modulating element for red display, whereupon a multi-layered liquid crystal light modulating element 100f was obtained.

The resin bodies 13 of each liquid crystal light modulating element layer 100a' and 100a" were placed such that the resin bodies 13 in each liquid crystal light modulating element layer 100a' and 100a" appeared offset relative to each other between adjoining liquid crystal light modulating element layers 100a" and 100a' when seen from the direction A perpendicular to the light modulating surface of the element 100f as shown in FIG. 10.

Using the multi-layered liquid crystal light modulating element 100f prepared in this manner, the resin bodies 13 of the second and third liquid crystal light modulating element layers 100a″ and 100a′ were almost invisible, while only the resin bodies 13 of the first liquid crystal light modulating element layer 100a′ were clearly seen. Therefore, though the resin bodies 13 in each element layer were placed such that they were offset from each other, there was little reduction in the display quality. In addition, when seen from the direction A perpendicular to the light modulating surface of the element 100f, the number of situations in which there is no resin body at a particular corner of each pixel in a set of adjacent stacked pixels across all layers is reduced, reducing variations in the thickness of the multi-layered element as a whole and eliminating the unevenness in display due to said variations.

Comparison Elements Example

The same liquid crystal material, spacer material and sealing resin as in the element example (1) were used, and resin bodies 13 made of PES-380S30 polyester resin (manufactured by Three Bond) were formed using the screen printing method on a 20 cm square (i.e., 20 cm×20 cm) polyether sulfone substrate 1a having 320 μm-wide ITO electrodes, which were aligned at 30 μm intervals, such that the resin bodies 13 comprised approximately 40 μm-diameter cylinders and were located at a 350 μm pitch. The resin bodies 13 were placed such that they were located at all four corners of each pixel 2, i.e., in all the areas of intersection between the vertical columns 2a and horizontal rows 2b of space between the pixels 2.

Another substrate 1b was placed over the substrate 1a, and a liquid crystal material was injected to obtain an STN liquid crystal light modulating element.

With this liquid crystal light modulating element, the resin bodies 13 obstructed the field of view, and the element was dark and difficult to observe, in comparison with the element 100a obtained under element example (1).

As described above, the present invention can provide a liquid crystal light modulating element that has a pair of substrates and a liquid crystal light modulating layer sandwiched between the substrates, and in which multiple pixels are aligned in a matrix arrangement, as well as a multi-layered liquid crystal light modulating element comprising multiple said liquid crystal light modulating elements stacked in a layered fashion, wherein increasing the resolution does not reduce the production efficiency for the elements, and a good effective display rate and strength can be maintained.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A multi-layered liquid crystal light modulating element comprising:

multiple liquid crystal light modulating element layers, each liquid crystal light modulating element layer having a pair of substrates and a liquid crystal light modulating layer, in which a plurality of pixels are aligned in a matrix, sandwiched between the substrates;

wherein the liquid crystal light modulating layers in each liquid crystal light modulating element layer have a liquid crystal material that performs light modulation, spacers that control a size of a gap between the pair of substrates, and resin bodies that are located inside of a light modulation range and which support the pair of substrates;

wherein the resin bodies are systematically located in each liquid crystal light modulating layer according to the principle that: (i) the resin bodies are located in areas of intersection between vertical columns and horizontal rows of space between pixels, but (ii) no resin body is located at at least one corner of a portion of said pixels; and wherein the resin bodies in each light modulating layer are located such that they appear to overlap between adjoining light modulating layers when viewed from a direction perpendicular to a light modulating surface of the multi-layered liquid crystal light modulating device.

2. A liquid crystal light modulating element in accordance with claim 1, wherein:

the resin bodies are positioned along lines that are parallel to an alignment of the pixels, and are positioned at intervals that are an integral multiple, greater than one, of the pixel pitch.

3. A liquid crystal light modulating element in accordance with claim 1, wherein:

the resin bodies are positioned along lines that are diagonal to an alignment of the pixels, and are positioned at intervals that are an integral multiple of the pixel pitch.

4. A liquid crystal light modulating element in accordance with claim 1, wherein:

at least a portion of the pixels have no corner thereof having a resin body proximate thereto.

5. A liquid crystal light modulating element in accordance with claim 1, wherein:

an effective display rate of each of said liquid crystal elements is at least approximately 80%.

6. A liquid crystal light modulating element in accordance with claim 1, wherein:

each of said liquid crystal light modulating element layers includes a liquid crystal material that exhibits a cholesteric phase and a selective reflection wavelength, and wherein the selective reflection wavelength of each of said liquid crystal light modulating element layers is different.

7. A liquid crystal light modulating element in accordance with claim 1, wherein:

a softening temperature of a resin material of said resin bodies is higher than a transition temperature of said liquid crystal material to an isotropic phase thereof, and wherein said softening temperature of said resin material is lower than a softening temperature of a material of said substrates.

8. A multi-layered liquid crystal device, comprising:

a plurality of substantially planar liquid crystal elements stacked together;

each liquid crystal element comprising:
  a pair of spaced apart substrates; and
  a light modulating layer sandwiched between said substrates, said light modulating layer including a plurality of pixels arrayed in a matrix arrangement in a light modulation range, liquid crystal material for performing light modulation, spacers for controlling a size of a gap between the pair of substrates, and resin bodies for supporting the pair of substrates, at least a portion of said resin bodies being located in said light modulation range;

wherein the resin bodies are positioned in the light modulating layer at intersections of columns between pixels and rows between pixels and the resin bodies are arrayed in said light modulating layer such that a portion of said plurality of pixels are pixels having at least one corner thereof which does not have a resin body proximate thereto; and wherein the resin bodies in each liquid crystal element are positioned, relative to the resin bodies in an adjoining liquid crystal element, at substantially overlapping positions as viewed from a direction perpendicular to a planar surface of said multilayered liquid crystal device.

9. A liquid crystal device in accordance with claim 8, wherein:

the resin bodies are positioned along lines that are parallel to an alignment of the pixels, and are positioned at intervals that are an integral multiple, greater than one, of the pixel pitch.

10. A liquid crystal device in accordance with claim 8, wherein:

the resin bodies are positioned along lines that are diagonal to an alignment of the pixels, and are positioned at intervals that are an integral multiple of the pixel pitch.

11. A liquid crystal device in accordance with claim 8, wherein:

the pixel pitch in each liquid crystal element is at least 300 um.

12. A liquid crystal device in accordance with claim 8, wherein:

at least a portion of the pixels have no corner thereof having a resin body proximate thereto.

13. A liquid crystal device in accordance with claim 8, wherein:

said liquid crystal material for performing light modulation is a material selected from the group consisting of twisted nematic liquid crystal material, super-twisted nematic liquid crystal material, cholesteric nematic phase transition liquid crystal material, liquid crystal material comprising a nematic liquid crystal material, and a ferroelectric or anti-ferroelectric liquid crystal material that exhibits a smectic phase at room temperature, and any combination of two or more thereof.

14. A liquid crystal device in accordance with claim 8, wherein:

said resin bodies comprise a high molecular weight polymer material selected from the group consisting of thermoplastic resins, heat-hardened resins, UV-hardened resins and any combination of two or more thereof.

15. A liquid crystal device in accordance with claim 8, wherein:

an effective display rate of each of said liquid crystal elements is at least approximately 80%.

16. A liquid crystal device in accordance with claim 8, wherein:

each of said liquid crystal elements includes a liquid crystal material that exhibits a cholesteric phase and a selective reflection wavelength, and wherein the selective reflection wavelength of each of said liquid crystal elements is different.

17. A liquid crystal device in accordance with claim 8, wherein:

a softening temperature of a resin material of said resin bodies is higher than a transition temperature of said liquid crystal material to an isotropic phase thereof, and wherein said softening temperature of said resin material is lower than a softening temperature of a material of said substrates.

18. A liquid crystal device in accordance with claim 8, wherein:

said portion of said plurality of pixels is a majority of said plurality of pixels.

19. A liquid crystal device in accordance with claim 8, wherein:

said portion of said plurality of pixels includes each of said plurality of pixels.

20. A method of making a multi-layered liquid crystal device comprising the steps of:

forming a plurality of substantially planar liquid crystal elements;

wherein said step of forming each of said liquid crystal elements includes:

providing a first substrate having an electrode pattern formed thereon so as to define a pixel matrix;

forming a plurality of resin bodies on said first substrate, said resin bodies being formed at intersections of columns between pixels and rows between pixels and said resin bodies are arrayed thereon such that a portion of said plurality of pixels are pixels having at least one corner thereof which does not have a resin body proximate thereto;

dispersing a plurality of spacers on said first substrate;

heating said substrate to a temperature above an isotropic phase transition temperature of a liquid crystal material;

depositing said liquid crystal material on said substrate;

applying a second substrate on said first substrate so as to confine said resin bodies, spacers and liquid crystal material therebetween;

applying a clamping force between said substrates; and heating said clamped substrates to a temperature above a softening point of a resin material of said resin bodies; and stacking said plurality of said liquid crystal elements together;

wherein said resin bodies are positioned and said plurality of liquid crystal elements are positioned relative to each other during stacking such that the resin bodies in each liquid crystal element are positioned, relative to the resin bodies in an adjoining liquid crystal element, at substantially overlapping positions as viewed from a direction perpendicular to a planar surface of said multi-layered liquid crystal device.

21. A method of making a liquid crystal device in accordance with claim 20, wherein:

in the step of forming a plurality of resin bodies on said first substrate the resin bodies are positioned along lines that are parallel to an alignment of the pixels, and are positioned at intervals that are an integral multiple, greater than one, of the pixel pitch.

22. A method of making a liquid crystal device in accordance with claim 20, wherein:

in the step of forming a plurality of resin bodies on said first substrate the resin bodies are positioned along lines that are diagonal to an alignment of the pixels, and are positioned at intervals that are an integral multiple of the pixel pitch.

23. A method of making a liquid crystal device in accordance with claim 20, wherein:

the pixel pitch in each liquid crystal element is at least 300 um.

24. A liquid crystal device in accordance with claim 20, wherein:

in the step of forming a plurality of resin bodies on said first substrate, the resin bodies are positioned, relative to said pixels, so that at least a majority of the plurality of pixels are pixels having no corner thereof which has a resin body proximate thereto.

* * * * *